Aug. 18, 1936.  D. K. MACLEOD  2,051,613
VENTILATOR
Filed July 23, 1934  9 Sheets—Sheet 1

Donald K. Macleod,
Inventor
by
Attorney

Aug. 18, 1936. D. K. MACLEOD 2,051,613
VENTILATOR
Filed July 23, 1934 9 Sheets-Sheet 3

Inventor
Donald K. Macleod
Attorney

Aug. 18, 1936. D. K. MACLEOD 2,051,613
VENTILATOR
Filed July 23, 1934 9 Sheets-Sheet 5

Fig.5.

Inventor
Donald K. Macleod,
By
Attorney

Aug. 18, 1936.　　　　D. K. MACLEOD　　　　2,051,613
VENTILATOR
Filed July 23, 1934　　　9 Sheets-Sheet 6

Inventor
Donald K. Macleod,
By
Attorney

Aug. 18, 1936.   D. K. MACLEOD   2,051,613
VENTILATOR
Filed July 23, 1934   9 Sheets-Sheet 7

Inventor
Donald K. Macleod
By
Attorney

Aug. 18, 1936.　　　D. K. MACLEOD　　　2,051,613
VENTILATOR
Filed July 23, 1934　　　9 Sheets-Sheet 8

Inventor
Donald K. Macleod,
by
Attorney

Aug. 18, 1936. D. K. MACLEOD 2,051,613
VENTILATOR
Filed July 23, 1934    9 Sheets-Sheet 9

Inventor
Donald K. Macleod,
By
Attorney

Patented Aug. 18, 1936

2,051,613

UNITED STATES PATENT OFFICE 2,051,613

VENTILATOR

Donald K. Macleod, Youngstown, Ohio, assignor to Truscon Steel Company, Youngstown, Ohio, a corporation of Michigan Application July 23, 1934, Serial No. 736,609

16 Claims. (Cl. 98—94)

Many endeavors have been made to provide mechanically controlled ventilation for a room, and at the same time preventing the entrance through the ventilator of outside noises. Certain serious objections have developed in connection therewith, one of the outstanding ones being the large size and bulk of the unit within the room which makes the same unsightly and constitutes a serious hindrance toward proper draping and furnishing of the window space. Another is the high cost of the installed unit.

The primary object of the present invention is to provide a structure which will overcome both of the above objections, and at the same time provide a proper unit that will insure the flow of air and itself will be very quiet in action by reason of eliminating the vibration normally caused by the motor and the consequent noise thereby developed.

Another object is to provide means whereby the air can be filtered if desired.

Still another object is to provide novel means by which access to the various parts is easily obtainable from the inside of the room without the necessity of removing the ventilator from the window or other opening.

Still another object is to provide novel means by which the inflowing air can be directed as desired towards different points in the room, thus avoiding direct drafts at undesired places.

An embodiment of the invention which has proven to be entirely satisfactory for carrying out the above and other objects is disclosed in the accompanying drawings, wherein:—

Considering first the ventilating unit proper, the same comprises a sheet metal casing of angular form, having a top wall 26, a bottom wall 27, a rear wall 28, end walls 29, the outer portions of which are in the form of louvers 30, and an open inner side. This casing, with the exception of the louver ends is lined with sound-absorbing sheets 31 which are preferably of composition material having perforations or sockets 32. The material may be of the type disclosed in patents to Newsom Nos. 1,655,194 and 1,655,195. The bottom and top linings comprise central sections 33 and end sections 34 spaced apart, as shown in Figure 4, and thus provide upper and lower guideways 35, which as will be clear by reference to Figure 3, converge inwardly or toward the open side of the casing.

Figure 17:
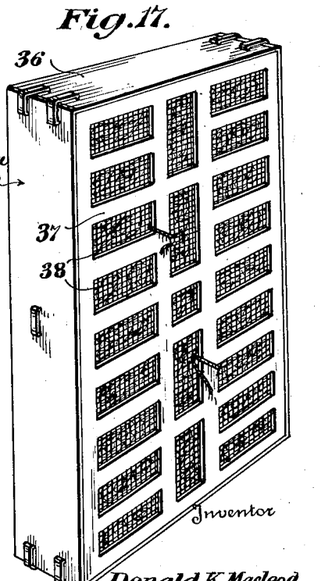
Figure 17 is a perspective view of one of the filter packs.
Figure 18:
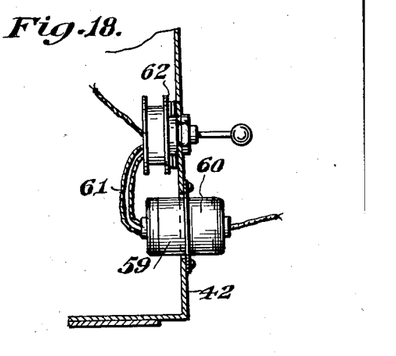
Figure 18 is a detail sectional view showing the arrangement and mounting of the supply plug and circuit controller.
Figures 22, 23, 24, 25:
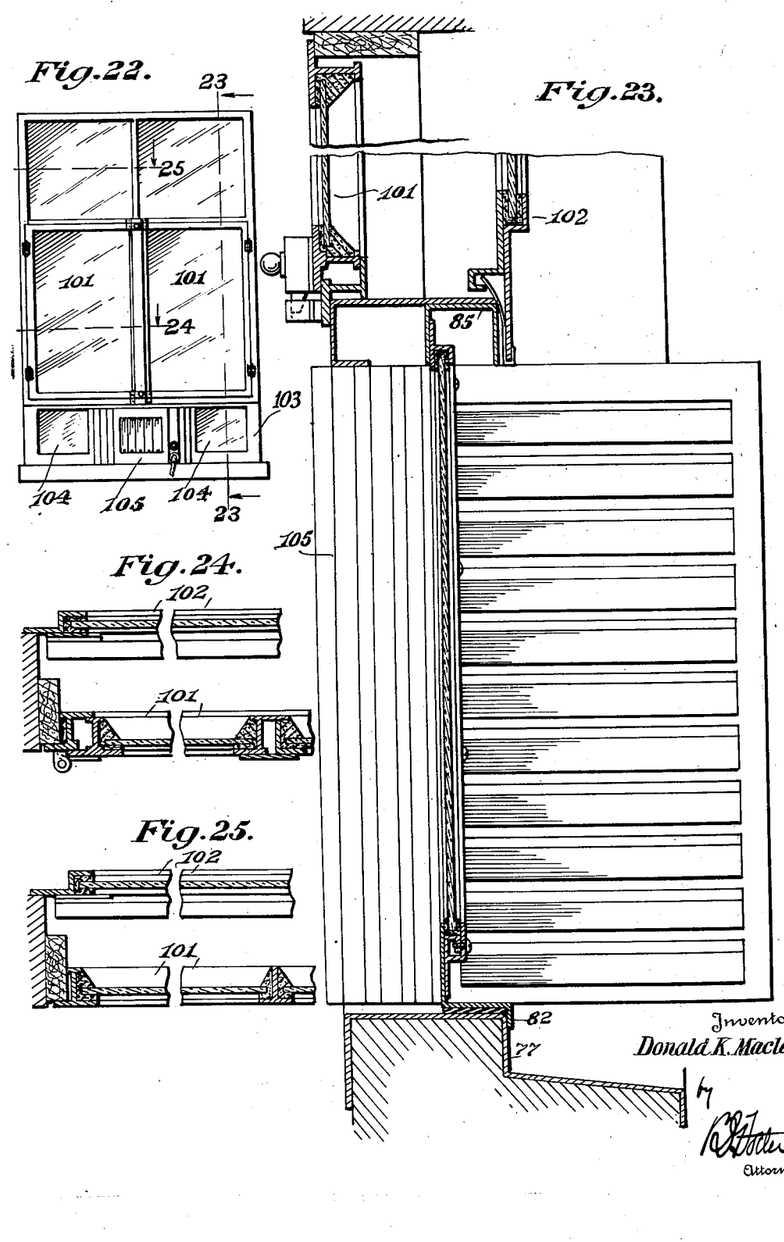
Figure 22 is a view in elevation of the structure associated with a different type of window.
Figure 23 is a vertical sectional view on an enlarged scale on the line 23—23 of Figure 22.
Figures 24 and 25 are sectional views taken respectively on the lines 24 and 25 of Figure 22.

In these guideways 35 are slidably and removably located filter packs which are shown in detail in Figure 17. Each of these packs consists of an angular casing 36 preferably of waterproofed cardboard or the like, and side walls 37 that are open-work and are backed, at least on one side by screen material 38. This boxing is filled with some filter material, as interlaced fibers, and for the purpose spun glass has been found peculiarly effective. The fibers are coated with a suitable viscous substance, to which dust particles in the air will adhere. The material therefore acts to clean and purify the air, and also has considerable sound-deadening or absorbing characteristics.

Figure 3:
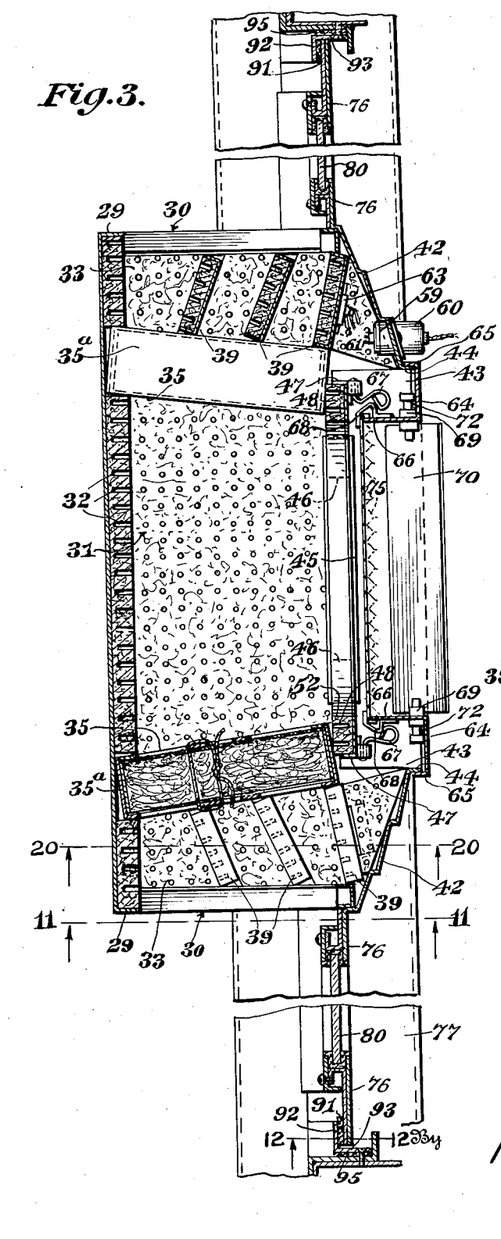
Figure 3 is a horizontal sectional view on the line 3—3 of Figure 2.
Figure 4:
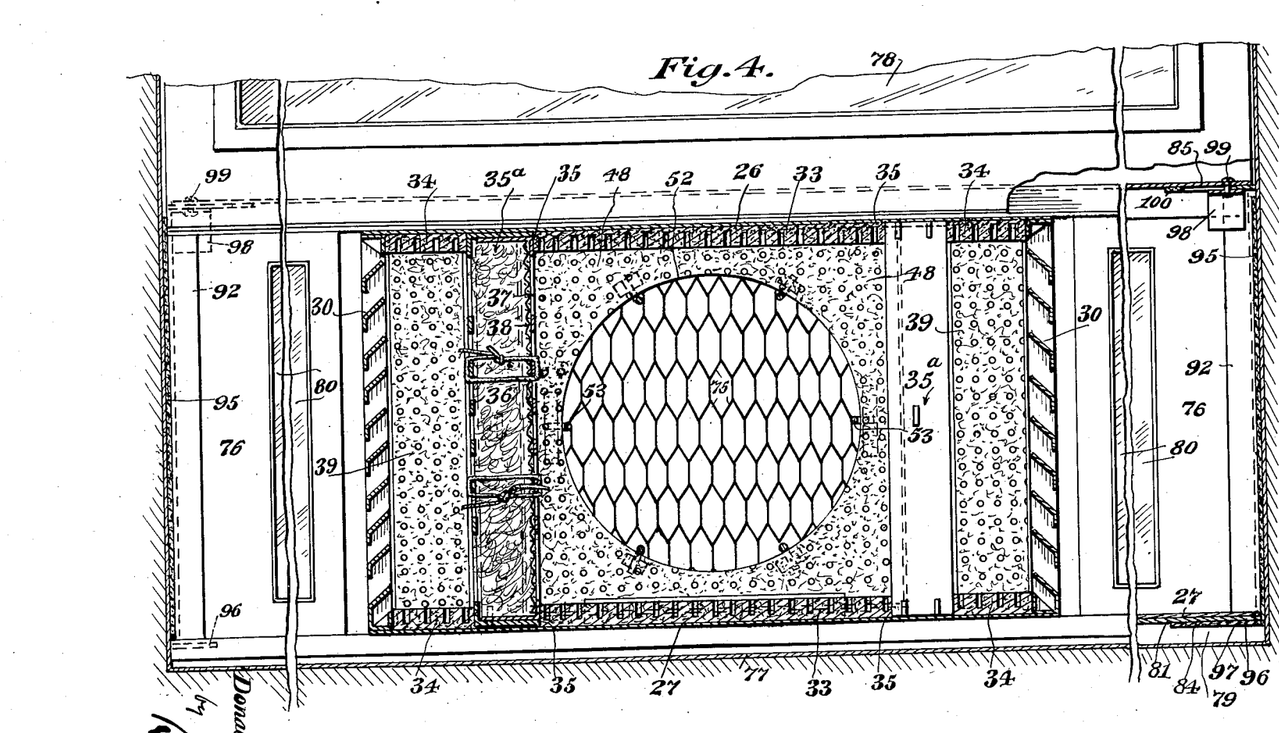
Figure 4 is a vertical longitudinal sectional view on the line 4—4 of Figure 2.
Figures 13, 14, 16:
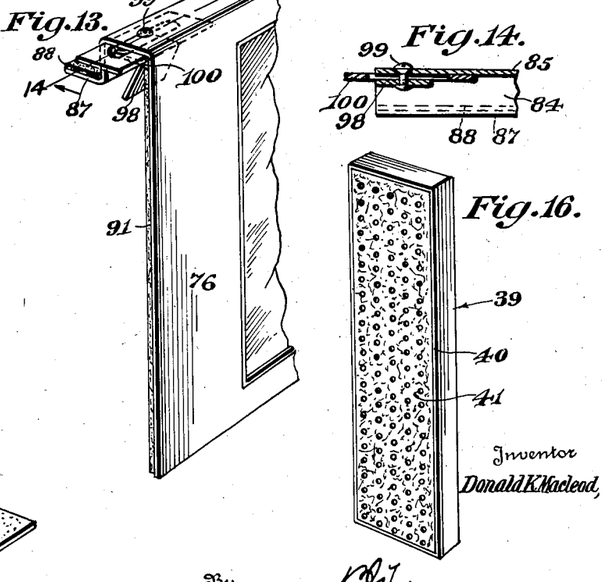
Figure 13 is a perspective view of one of the end portions of the supporting panel.
Figure 14 is a detail sectional view on the line 14—14 of Figure 13.
Figure 16 is a perspective view of one of the baffles.
Figure 15:
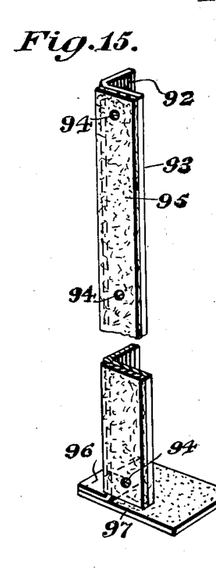
Figure 15 is a perspective view of one of the end filling pieces.

It will be noted by reference to Figure 3 that the filters 35a are spaced from the louver walls 30, and in these spaces are placed sound-absorbing baffles 39 preferably held in place by the end lining pieces 33 which are in sections that are located between the upper and lower ends of said baffle plates. These baffle plates, it will be noted, are placed vertically or across the inner sides of the louvers 30 and are transversely inclined rearwardly, or in other words, are diagonal to the louvers, with their sound-absorbing surfaces thus diagonally opposed to the air entering through the louvers. As shown particularly in Figure 16 these baffles each consists of a metallic casing 40 having an open side and housing the sound absorbent material 41, the perforated face of which is however, exposed as shown.

Figures 2, 19:
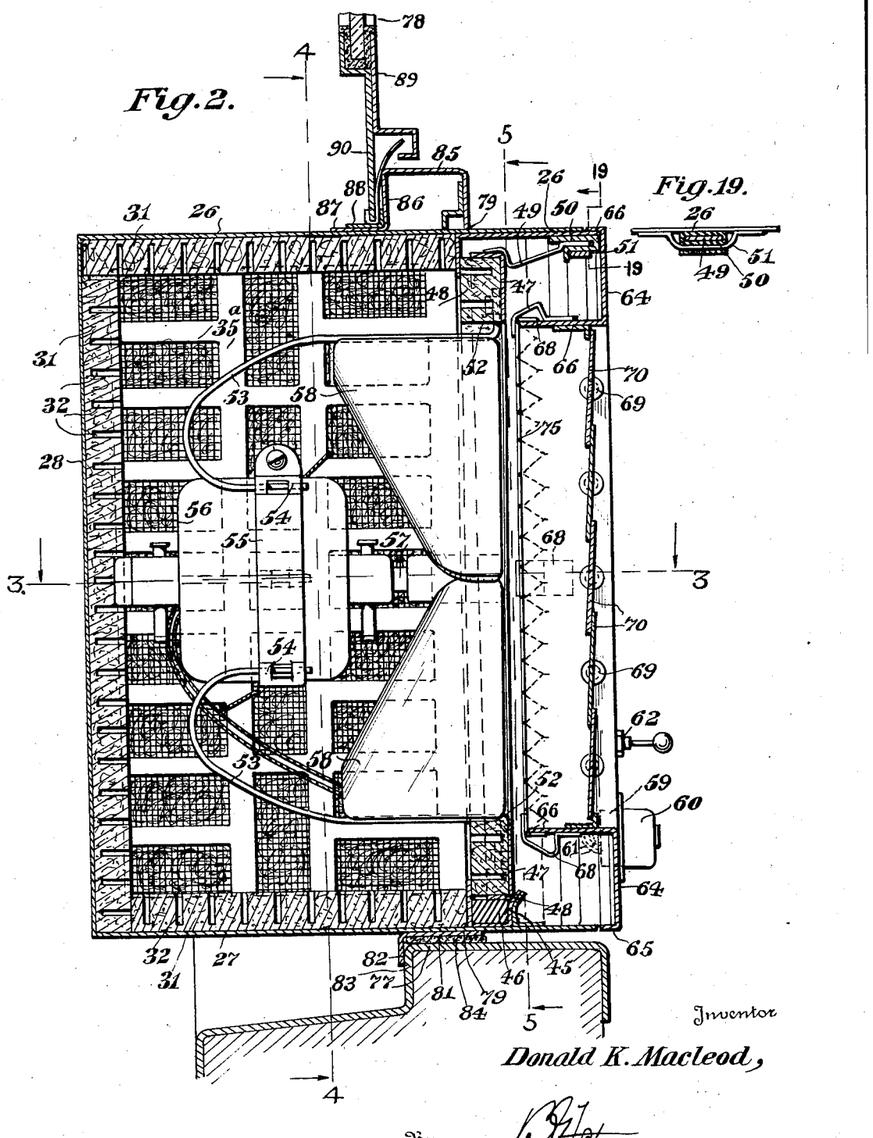
Figure 2 is a vertical sectional view on the line 2—2 of Figure 1.
Figure 19 is a detail view on the line 19—19 of Figure 2.
Figure 5:
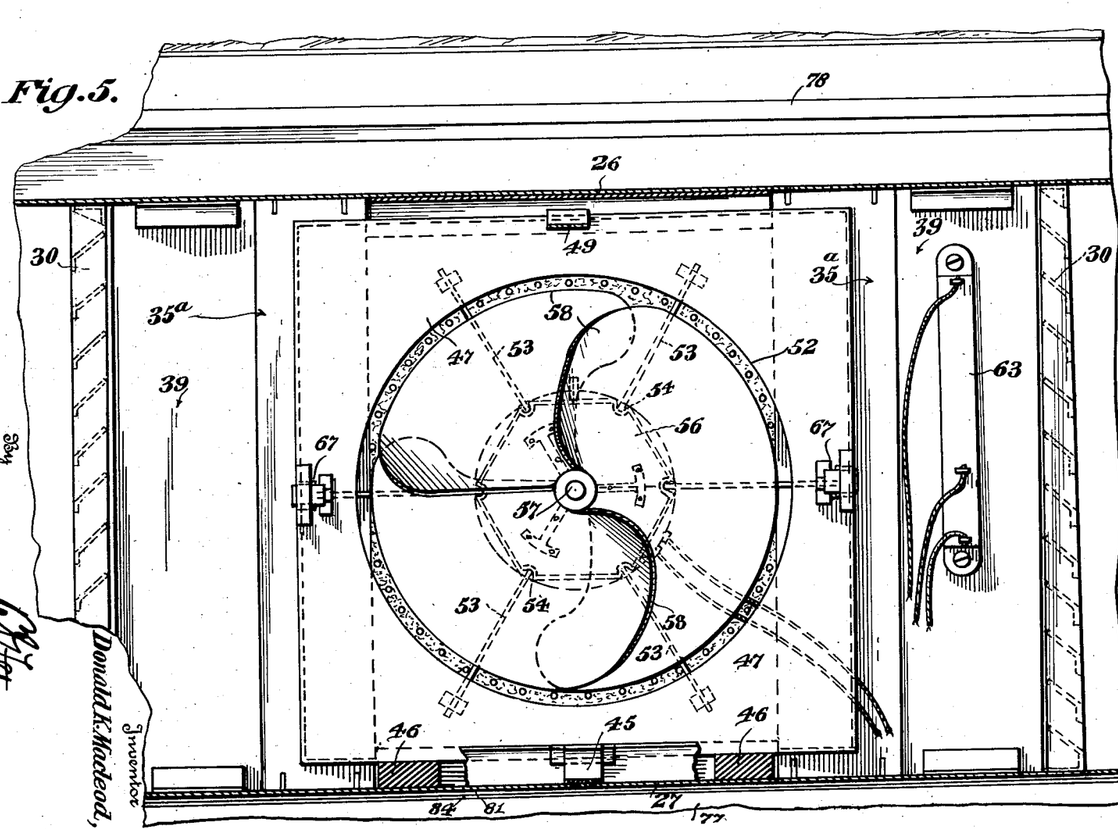
Figure 5 is a vertical longitudinal sectional view on the line 5—5 of Figure 2.
Figure 6:
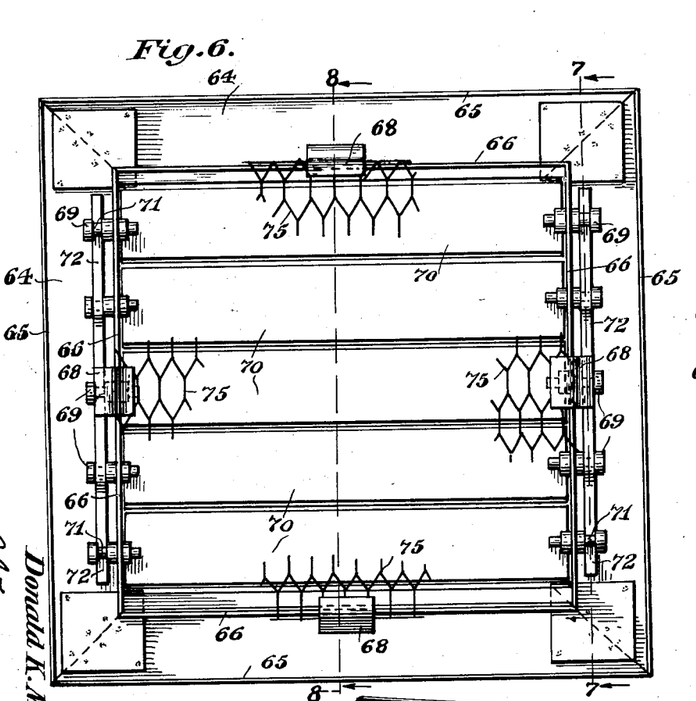
Figure 6 is a rear elevation of the facing panel member and air directing blades.
Figure 7:
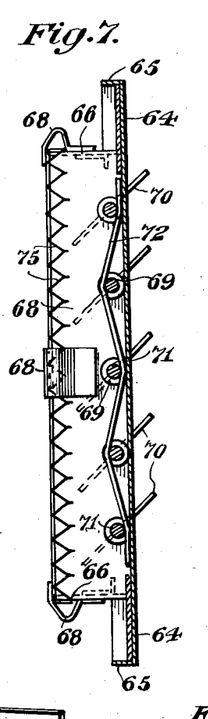
Figures 7 and 8 are vertical sectional views respectively on the lines 7—7 and 8—8 of Figure 6.
Figure 8:
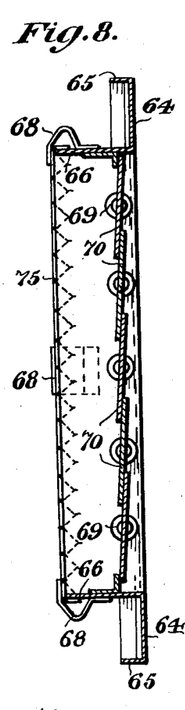
Figure 9:
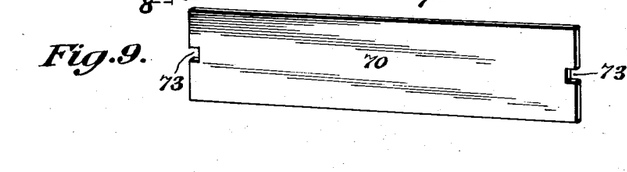
Figure 9 is a perspective view of one of the blades.

The inner open side of the casing is partially covered by an inner wall 42, the opposite sides of which are inwardly stepped, so that the wall, as a whole, extends slightly inwardly, this inward extension, however, being relatively small as compared to the main casing body. The front wall provides a square opening 43 surrounded by an outstanding flange 44 (see Figure 3). Referring now particularly to Figure 2, the bottom wall 27 is provided with a keeper groove formed by upstanding flanges 45 in which are placed blocks of yielding material 46. These constitute a yielding support for a removable panel member, consisting of a metal facing sheet 47, to the rear side of which is affixed a sheet 48 of sound-absorbing material. The lower edge of the panel member 47—48 rests upon the blocks 46 and is retained between the flanges 45. The upper end is held in place by a retaining latch 49 whose mounted end is fitted into a sound deadening fabric 50 and engaged in a keeper 51 secured to the interior of the top wall 26 at the inner margin thereof. This panel member 47—48 has a central circular opening 52 (see Figures 4 and 5), which provides for the flow of air from the chamber created within and by the casing. Secured to this panel member 47—48 are the spring arms 53 of a rearwardly extending supporting spider, said arms being bowed at their rear ends, so that their rear terminals extend forwardly and are engaged in the ears 54 of a clamping ring 55.

The clamping ring surrounds and holds the motor 56 of a fan, the shaft 57 thereof projecting forwardly and carrying the overlapping fan blades 58 whose formation, as is well-known, creates a strong draft with very little noise. These blades have their advance ends operating in the opening of the panel member.

It will thus be clear that the fan is supported within the outer portion of the casing by the panel member and that upon the removal of this panel member the fan in mounted condition is removable therewith, thereby giving access to the filter packs which may then be removed and replaced as desired.

For operating the fan a socket member 59 is mounted in the front wall and is adapted to receive a plug 60 conveying the current from any desired source. The socket member has an electrical connection 61 with a multiple thrown switch 62. The switch 62, in turn, has electrical connections with a variable resistance unit 63 (see Figures 3 and 5), and from this unit connections are made with the fan. It is believed to be unnecessary to go into detail regarding these electrical devices as they are well-known in the art and in themselves are standard equipment. By operating the switch in one direction, the motor may be run at one speed, and moving it in a different direction, the motor and consequently the fan will be driven at a different speed.

The inner square opening 43, formed in the inner side wall 42, is in turn closed by a square facing panel in the form of a sheet metal frame 64 having a marginal rearwardly extending flange 65 that overlies the outstanding flange 44 of the wall 42 (see Figure 3). This panel frame 64 in turn has a square opening surrounded by a rearwardly extending flange 66. The panel is held in place by upper and lower spring latches 67 carried by the fan-supporting panel 47—48 (see Figure 3), and engaging behind keepers 68 secured to the upper and lower sides of the flange 66.

The structure of this facing panel is shown in detail in Figures 6–10 inclusive. The upright portions of the flange 66 are provided with openings for the reception of the gudgeons 69 of air-directing vanes 70 that extend across the square opening in the panel and are individually operable. In order to hold these vanes wherever placed the gudgeons are extended beyond the flange 66 and have reduced portions 71 that receive friction spring 72. As shown two of these springs are provided that are interlaced with the gudgeons, so that each bears alternately on opposite sides of adjacent gudgeons, thus creating sufficient friction to hold each individual vane wherever placed, and yet permit its purposed movement. It is also to be noted that this panel member being square and the opening it covers being also square, the panel may be placed with the vanes either vertically or horizontally, and consequently by moving the vanes individually to any relation desired, air can be directed either upwardly or downwardly, or laterally, depending not only on the position of the individual vanes in the panel, but also the position of the panel with the vanes horizontal or vertical.

Figure 10:
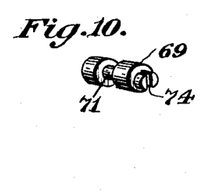
Figure 10 is a similar view of one of the gudgeons for said blades.
Figure 11:
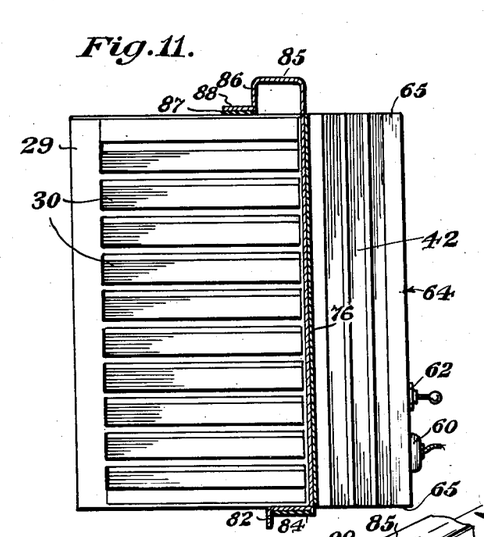
Figure 11 is a vertical sectional view on the line 11—11 of Figure 3 and showing one of the louver end walls.
Figure 12:
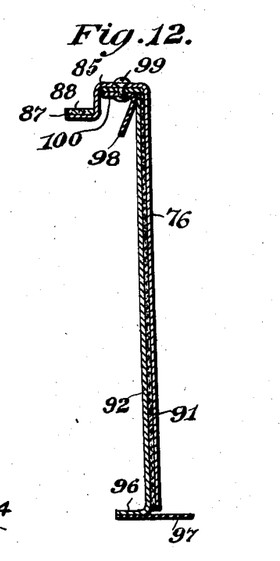
Figure 12 is a vertical sectional view taken on the line 12—12 of Figure 3.

The preferred detail construction of the vanes 70 and their mountings, is shown in Figure 10. Each vane has its ends notched as shown at 73, and the ends of the gudgeons 69 are notched at 74. These are interfitted and welded or otherwise suitably secured so as to insure that the gudgeons will turn with the vanes.

Obviously if the vanes are individually opened by hand there is some danger of the fingers passing through and being struck by the revolving fan blades. To prevent this a guard of foraminous material is interposed between the vanes and the fan. This is preferably in the form of a sheet of expanded metal 75 which is secured to the rear edge of the marginal flange 66.

Figures 1, 20, 21:
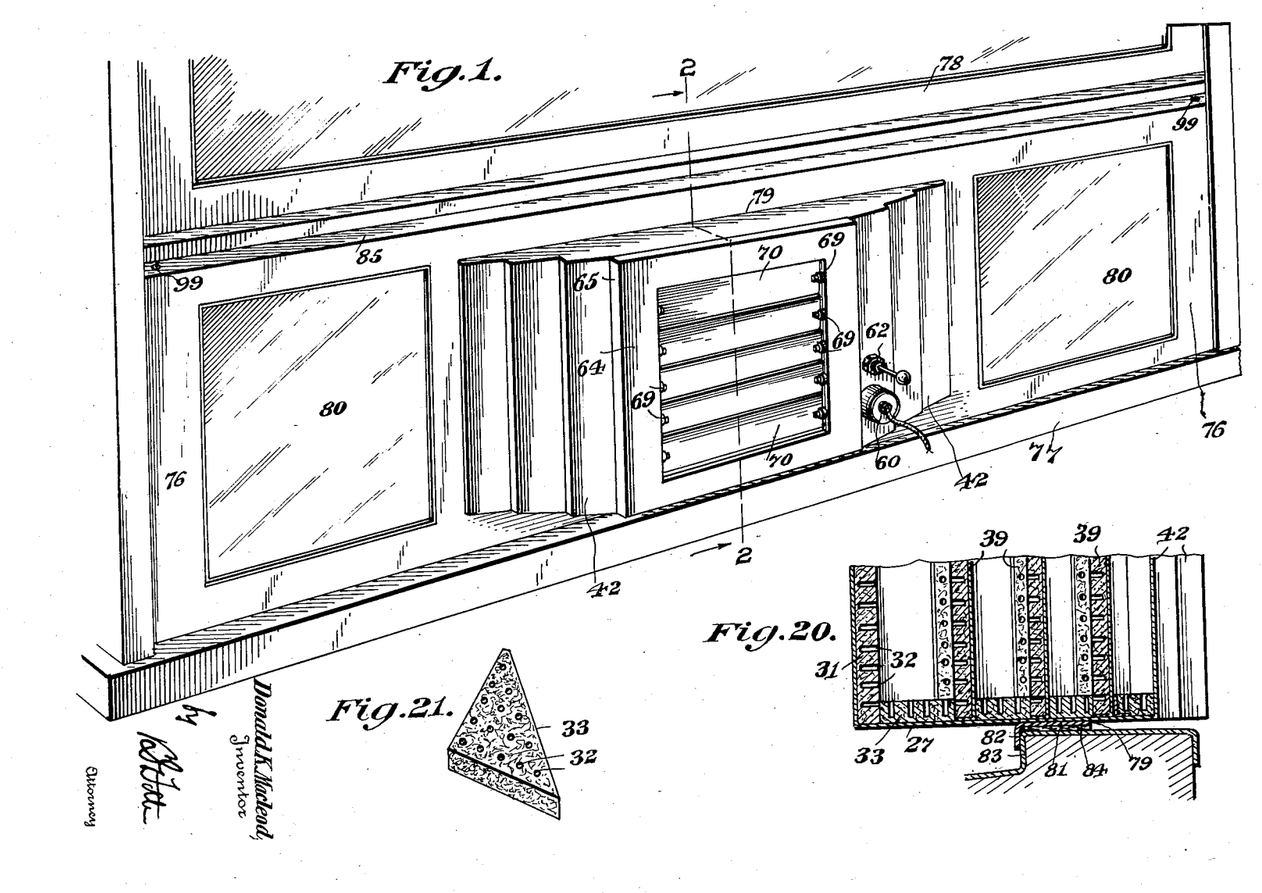
Figure 1 is a perspective view of the inner side of the structure installed in a window opening beneath a vertically sliding sash.
Figure 20 is a vertical sectional view on the line 20—20 of Figure 3.
Figure 21 is a detail perspective view of one of the sound absorbing lining blocks or sections.

The unit may be of a standardized size, but as it is to be employed in connection with windows of various sizes and characters it is adapted to be placed in mountings that respectively will fit such windows. Thus in Figures 1, 2, and 3 a paneled mounting is provided including a frame 76 adapted to be mounted on the sill 77 and having the lower vertically moving sash 78 resting thereon. This frame as shown is provided with a central opening 79 to receive the unit and has glass panels 80 on opposite sides thereof. Where the window is narrow the length of the supporting panel member is of course less and the glass 80 may be dispensed with.

Referring to Figure 2 it will be noted that the lower longitudinal frame bar 81, which rests upon the sill 77, has on its outer side a depending flange 82 that overlies the vertical portion 83 of said sill. A packing strip 84, carried by the underside of the frame bar 81, serves to prevent moisture driving under this frame bar. The top frame bar is designated 85 and may be of tubular construction. It is provided on its outer side with a depending wall 86 and an outstanding flange 87 carrying a packing strip 88. The lower rail 89 of the sash 76 has a depending strip 90 that lies alongside the wall 86 and bears upon the packing strip 88.

In order that the ends of this supporting panel member 76 may be fitted snugly to the window frame structure, the arrangement shown in Figures 12–15 inclusive is preferably employed. The rear face of each end of the panel member has a vertical felt packing strip 91, and against the same is placed one of the flanges 92 of an upright angle bar, the other flange 93 being adapted to lie against the vertical wall of the window frame, to which it is secured by fasteners passing through openings 94 formed therein. On the rear side of said flange 93 is a packing strip 95. The arrangement of the parts when together and in place will be clear by reference to Figure 3. The lower end of the angle bar 92—93 is provided with a foot 96 to which is secured an elongated packing strip 97 that rests on the sill. The upper end of the flange 92 extends behind the supporting panel member 76 and in advance of an angular bracket piece 98 secured to the top wall 85 by a screw 99. Interposed between this bracket piece 98 and said wall 85 and held by the screw 99 is an adjustable plate 100 that is adapted to slide over the top of the flange 92 of the angle bar, and close the space of the window frame.

To indicate how readily the structure may be employed with other types of windows, the modification of Figures 22–25 inclusive is illustrated. In this case a window is employed, including an inwardly swinging sash 101, on the outer side of which may be a storm window 102. The supporting panel member is located beneath the swinging sash 101, and is generally designated by the reference numeral 103. This may be substantially of the type already described, including glass panels 104 and a central ventilating unit 105 corresponding to the unit already described. In this particular structure the ventilator may be built in as part of the window structure, but as before stated, the unit can be a standardized unit set into the panel member and suitably secured in place.

Figure 26:
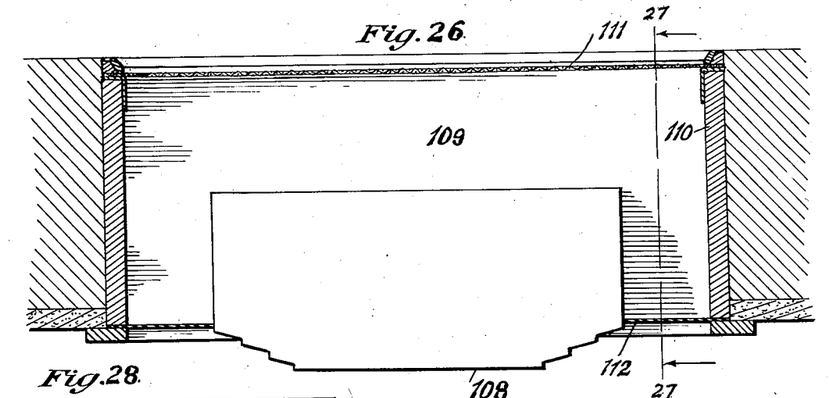
Figure 26 is a horizontal sectional view showing the structure mounted in the vent opening of a wall separate from or other than a window opening.
Figure 29:
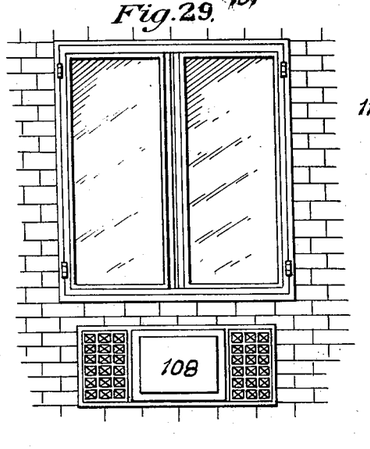
Figure 29 illustrates the outside face of installation wholly separated from a window.

The structure outlined in Figures 26 and 29 is to illustrate how the unit may be installed in a vent opening in a wall other than the usual window opening.

Thus the vent opening may be immediately below the window opening with the sill and stool 106 thereof constituting the top wall of such vent opening and the unit 107 constructed as above described in detail inserted therein. Figure 29 is an outside view showing the installation 108 at a point below the window with a portion of the wall between the two. Obviously therefore the structure may be located at various places in a wall.

Figure 27:
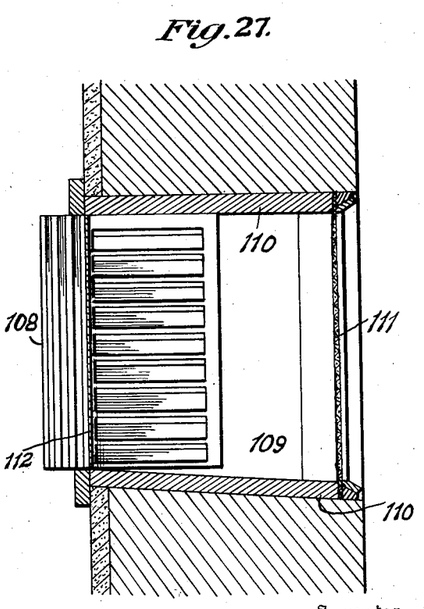
Figure 27 is a vertical sectional view on the line 27—27 of Figure 26.
Figure 28:
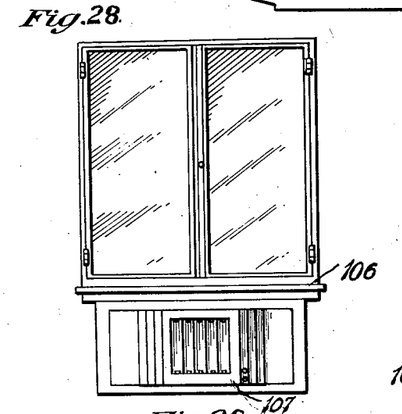
Figure 28 is an inside face view showing such an installation directly beneath the usual window sill.

The details of such an installation will be clear by reference to Figures 26 and 27. The opening 109 is suitably framed as illustrated at 110. The outer side may be screened as shown at 111. At the inner side is a panel 112, and in this panel is mounted the unit 108. The opening 109 is of course made longer than the unit to give ample space for the passage of air into the end louvers.

It is to be noted that with this structure the ventilator proper is almost entirely outside the window and the air vents being located in both ends, will provide an ample supply without reference to the direction of wind or storm. The parts within are completely protected and the passageway created as well as the chamber in which the fan is located is such that outside sound is absorbed almost completely and thus air is delivered into the room without the accompanying noises. It has been found that the fan mounting also by preventing material vibration and sound therefrom, makes a very quiet air delivering means. Where the outside air is impure the use of the filters insures material purification and it has been found that these filters by reason of their structure and the material used do not clog up but will successfully operate for a long period of time without the necessity of cleaning or replacement.

The motor is easily available by removing the facing panel and the fan carrying panel, thus making it easily available for inspection, lubrication, etc. The facing panel, being square as already explained can be placed with the vanes vertical or horizontal and these vanes can be individually turned in different directions so as to direct the air as desired.

From the foregoing, it is thought that the construction, operation and many advantages of the herein described invention will be apparent to those skilled in the art without further description, and it will be understood various changes in the size, shape, proportion and minor details of construction may be resorted to without departing from the spirit or sacrificing any of the advantages of the invention.

What I claim, is:

1. In a window ventilator, the combination with a casing providing a chamber, the end walls of the casing being louvered to provide opposite air inlets, the inner side of the casing providing an air outlet, of sound absorbing baffle blades located across the inner sides of the louvers and disposed transversely diagonally thereto, and a power fan located in the casing.

2. In a window ventilator, the combination with a casing having an outer wall providing an air inlet, said casing having an inner air outlet, of an air filter in the casing and spaced from the air inlet, and a plurality of sound absorbing baffles interposed between the air inlet and the filter.

3. In a window ventilator, the combination with a casing having an outer louvered wall providing an air inlet, said casing having an inner air outlet, of an air filter in the casing and spaced from the louvers of the air inlet, and a plurality of diagonally set sound absorbing baffles interposed between the air inlet and the filter and located transversely to the louver blades.

4. In a window ventilator, the combination with a casing having louvered end walls providing opposite outer air inlets, the inner side of the casing having an air outlet, a sound absorbing lining in the casing having sections spaced apart providing guideways between them, filter packs removably mounted in said guideways, and a fan in the casing for drawing air through the inlets and air filters and delivering the same through the outlet.

5. In a window ventilator, the combination with a casing having louvered end walls and an open inner side, of a lining of sound absorbent material covering the inner sides of the outer side and the top and bottom walls, said top and bottom linings being in sections forming upper and lower guideways, air filter packs detachably engaged in the guideways and removable through the inner open side of the casing, and sound absorbent deflectors interposed between the louvers and the filter packs and arranged diagonally and transversely to the louvers.

6. In a window ventilator, the combination with a casing having louvered end walls and an open inner side, of a lining of sound absorbent material covering the inner sides of the outer side and the top and bottom walls, said top and bottom linings being in sections forming upper and lower guideways, air filter packs detachably engaged in the guideways and removable through the inner open side of the casing, sound absorbent deflectors interposed between the louvers and the filter packs and arranged diagonally and transversely to the louvers, and a fan mounted in the casing between the filter packs.

7. In a window ventilator, the combination with a casing having an outer air inlet and an inner open side, of a panel detachably mounted in the open side of the casing and having an air outlet opening, outwardly extending arms carried by the panel, a motor mounted on the arms, and a fan operated by the motor and operating across the outlet opening.

8. In a window ventilator, the combination with a casing having an outer air inlet and an inner open side, of a panel of sound absorbing material detachably mounted in the open side of the casing on sound insulating means and having an air outlet opening, outwardly extending yielding arms having insulated mountings on the panel, a motor mounted on the arms, and a fan operated by the motor and operating across the outlet opening.

9. In a window ventilator, the combination with a casing having louvered end walls providing opposite air inlet openings, said casing having an open inner side, of keepers at opposite sides of the open side, a panel detachably held by the keepers and having an air outlet opening, and a motor fan mounted on the panel and located in the casing behind the opening.

10. In a window ventilator, the combination with a casing having an open inner side and louvered end walls providing air inlets, of a sound absorbing lining on the interior of the casing save the louvered ends, air filter packs in the casing in spaced relation to the louvered ends, spaced sound absorbent deflectors interposed between the louvers and the filter packs, a panel removably mounted in the open side of the casing and having an air outlet opening, and a motor fan mounted on the rear side of the panel and located in the casing between the filters, said fan operating across the opening.

11. In a window ventilator, the combination with a casing for the passage of air and having an open side, of a fan in the casing and moving the air therethrough, movable air directing vanes across the open side in front of the fan, and a foraminous guard between the fan and the vanes.

12. In a window ventilator, the combination with a casing for the passage of air and having an open side, of a fan in the casing and moving the air therethrough, a panel member at the open side of the casing, pivotally mounted air deflecting vanes on the outer side of the panel member, and a foraminous guard on the rear side of the panel member between the vanes and the fan.

13. In a window ventilator, the combination with a casing having louvered end walls and an open side, of a sound absorbent lining in the casing save for the louvered ends, spaced air filters in the casing adjacent the louvered ends, sound absorbent baffles interposed between the louvers and the filters, a panel member in the open end of the casing and having an air outlet opening, a fan mounted on the panel member behind the opening and between the filters, a facing panel member mounted on the casing in advance of the fan carrying panel member and including pivotally mounted air directing vanes, and a foraminous guard on the rear side of the facing panel member and in advance of the fan.

14. In a window ventilator, the combination with a casing having an inner open side and an air passageway leading thereto, of air directing vanes across the open sides, gudgeons forming pivotal mountings for said vanes, and a friction spring for holding said vanes where placed on their pivotal movements, said spring being interlaced with the gudgeons.

15. In a window ventilator, the combination with a casing having an inner open side and an air passageway leading thereto, of air directing vanes across the open sides, gudgeons forming pivotal mountings for said vanes, and a leaf friction spring extending along the gudgeons and interlaced therewith to bear against opposite sides of adjacent gudgeons.

16. In a window ventilator, the combination with a mounting panel for introduction into a window or like frame, of a fitting between the end of the mounting panel and the frame wall comprising a vertical plate, means for attaching the plate to the side of the window frame at the end of the mounting panel, said plate having an inset portion lapping the end of the panel and having an offset foot, a weather strip between the panel and plate, a weather strip at the foot, and an extension piece adjustably mounted at the top corner of the panel and cooperating with the top of the plate that is secured to the window frame.

DONALD K. MACLEOD.